US011250542B2

(12) United States Patent
Baijal et al.

(10) Patent No.: US 11,250,542 B2
(45) Date of Patent: Feb. 15, 2022

(54) MOSAIC GENERATION APPARATUS AND METHOD

(71) Applicant: Samsung Electronics Co., Ltd., Suwon-si (KR)

(72) Inventors: Anant Baijal, Suwon-si (KR); Vivek Agarwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/026,926

(22) Filed: Sep. 21, 2020

(65) Prior Publication Data

US 2021/0104017 A1    Apr. 8, 2021

(30) Foreign Application Priority Data

Oct. 4, 2019   (KR) ........................ 10-2019-0123309

(51) Int. Cl.
*G06T 3/40* (2006.01)
*H04N 1/00* (2006.01)
*G06N 3/08* (2006.01)

(52) U.S. Cl.
CPC ............. *G06T 3/4038* (2013.01); *G06N 3/08* (2013.01); *G06T 3/4046* (2013.01); *H04N 1/00453* (2013.01)

(58) Field of Classification Search
None
See application file for complete search history.

(56) References Cited

U.S. PATENT DOCUMENTS

| | | | |
|---|---|---|---|
| 6,137,498 A | 10/2000 | Silvers | |
| 6,927,874 B1 | 8/2005 | Enokida et al. | |
| 7,012,623 B1* | 3/2006 | Kusama | ................ G06T 3/4038 345/629 |
| 8,085,318 B2* | 12/2011 | Ciudad | .............. H04N 1/00453 348/239 |
| 8,515,137 B2 | 8/2013 | Richards et al. | |
| 9,058,673 B2 | 6/2015 | Chen et al. | |
| 2008/0165200 A1* | 7/2008 | Chow | .................... G09G 5/363 345/531 |
| 2014/0204125 A1* | 7/2014 | Smith | ................... G06T 11/001 345/641 |
| 2019/0244060 A1* | 8/2019 | Dundar | .................... G06N 3/08 |
| 2020/0226724 A1* | 7/2020 | Fang | .................... G06K 9/6232 |
| 2020/0286273 A1* | 9/2020 | Chen | ................. G06K 9/00281 |

OTHER PUBLICATIONS

European Search Report dated Mar. 5, 2021 for EP Application No. 20198789.8.

(Continued)

*Primary Examiner* — Joni Hsu
(74) *Attorney, Agent, or Firm* — Nixon & Vanderhye P.C.

(57) ABSTRACT

A mosaic generation apparatus includes: a display outputting an image, a memory storing one or more instructions, and a processor configured to execute the one or more instructions stored in the memory to: extract a first feature value from one of a plurality of sub-base areas included in a base image, extract a second feature value from one source image selected from among a plurality of source images, and generate a sub-mosaic corresponding to the one sub-base area using the first feature value and the second feature value.

14 Claims, 10 Drawing Sheets

(56) References Cited

OTHER PUBLICATIONS

Tesfaldet et al., "Convolutional Photomosaic Generation via Multi-Scale Perceptual Losses"; Springer International Publishing, Cham, vol. 11131, Jan. 23, 2019, pp. 75-83.
Jetchev et al., "GANosaic: Mosaic Creation with Generative Texture Manifolds", Dec. 1, 2017; pp. 1-12; Arvix.Org Cornell University Library.

* cited by examiner

MOSAIC GENERATION APPARATUS AND METHOD

CROSS-REFERENCE TO RELATED APPLICATION

This application is based on and claims priority under 35 U.S.C. § 119 to Korean Patent Application No. 10-2019-0123309, filed on Oct. 4, 2019, in the Korean Intellectual Property Office, the disclosure of which is incorporated by reference herein in its entirety.

BACKGROUND

1. Field

The disclosure relates to a mosaic generation apparatus and an operation method thereof, and for example, to a method and apparatus for generating a mosaic by randomly selecting a source image and reinforcing the source image based on a feature of a base image.

2. Description of Related Art

Mosaic is a technique to make a pattern or painting by attaching various pieces to one another. In order to create a mosaic, a method of dividing a photo or picture for generating a mosaic into small areas and replacing each area with another photo or picture may be used.

An artificial intelligence (AI) system may refer to a system in which a machine trains and makes determinations by itself, derives desired results, or performs desired operations.

SUMMARY

Embodiments of the disclosure provide a method and apparatus for generating various mosaics from a source image that is randomly selected and a base image using a neural network.

Additional aspects will be set forth in part in the description which follows and, in part, will be apparent from the description.

According to an example embodiment of the disclosure, a mosaic generation apparatus includes: a display outputting an image, a memory storing one or more instructions, and a processor configured to execute the one or more instructions stored in the memory to: extract a first feature value from one of a plurality of sub-base areas included in a base image, extract a second feature value from one source image selected from among a plurality of source images, and generate a sub-mosaic corresponding to the one sub-base area using the first feature value and the second feature value.

The processor may be configured to execute the one or more instructions to: generate sub-mosaics respectively corresponding to the plurality of sub-base areas and generate a mosaic corresponding to the base image using the generated sub-mosaics.

The one sub-base area may be randomly selected from among the plurality of sub-base areas.

The one source image may be randomly selected from among the plurality of source images.

The one source image may be repeatedly selectable with respect to the plurality of sub-base areas.

The processor may be further configured to execute the one or more instructions to: extract the first feature value from a lower level and the second feature value from an upper level, using an artificial intelligence (AI) model including the lower level and the upper level.

The sub-mosaic may be generated such that a sum of a difference between feature values of the sub-mosaic and the sub-base area in the lower level and a difference between feature values of the sub-mosaic and the base area in the upper level is minimum.

The first feature value may include one or more pieces of information about a painting style, a painting type, texture, atmosphere, contrast, gloss, intensity, hue, and saturation of the sub-base image.

The second feature value may be content information including one or more of a shape and form of the source image.

The mosaic generation apparatus may further include: a user interface, and a communicator comprising communication circuitry, wherein the user interface may be configured to receive an input of the one sub-base area and the one source image and receive an input of one mosaic from among a plurality of mosaics in response to the processor generating the plurality of mosaics corresponding to the base image, and the communicator may be configured to transmit the selected mosaic to an external display.

According to an example embodiment of the disclosure, a mosaic generation method includes: extracting a first feature value from one sub-base area selected from a base image including a plurality of sub-base areas, extracting a second feature value from one source image randomly selected from a plurality of source images, and generating a sub-mosaic corresponding to the selected one sub-base area using the first feature value and the second feature value.

According to an example embodiment of the disclosure, a non-transitory computer-readable recording medium is provided, the non-transitory computer-readable recording medium having recorded thereon a program for executing on a computing device a mosaic generation method including: extracting a first feature value from one sub-base area selected from a base image including a plurality of sub-base areas, extracting a second feature value from one source image randomly selected from a plurality of source images, and generating a sub-mosaic corresponding to the selected one sub-base area using the first feature value and the second feature value.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
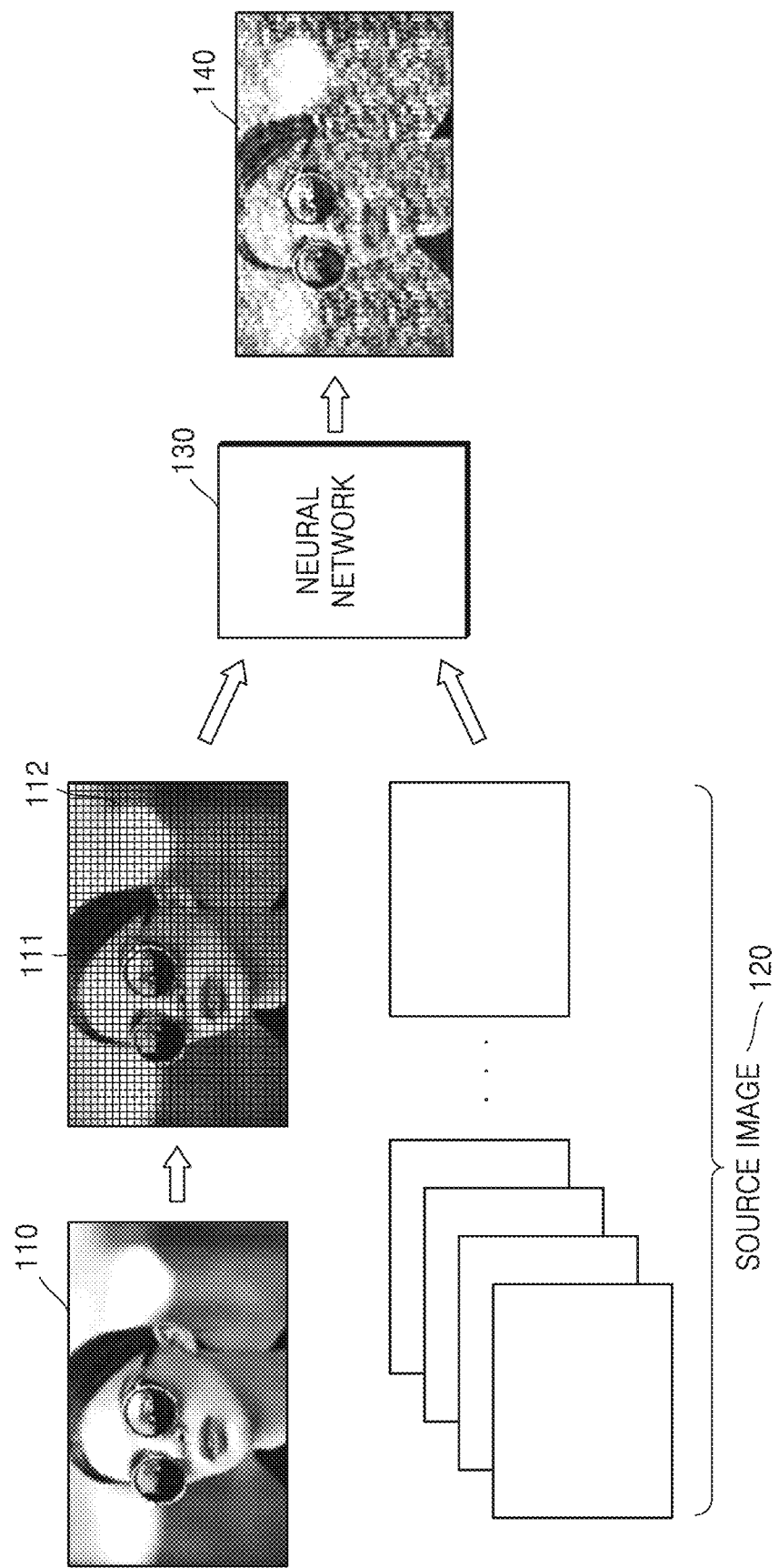
FIG. 1 is a diagram illustrating an example of generating a mosaic, according to an embodiment of the disclosure.

The disclosure will now be described in greater detail with reference to the accompanying drawings, in which various example embodiments of the disclosure are illustrated. The disclosure may, however, be embodied in many different forms and should not be understood as being limited to the embodiments of the disclosure set forth herein; rather, these embodiments of the disclosure are provided by way of non-limiting example.

The terms used in the disclosure have been selected from currently widely used general terms in consideration of the functions in the disclosure. However, the terms may vary according to the intention of one of ordinary skill in the art, case precedents, and the advent of new technologies. Accordingly, the terms used in the disclosure are defined based on their meanings in relation to the contents discussed throughout the disclosure, not by their simple meanings.

Furthermore, the terms used in the disclosure are used for explaining a various embodiments of the disclosure, not for limiting the disclosure.

In the disclosure, when an element "connects" or is "connected" to another element, the element contacts or is connected to the other element not only directly, but also electrically through at least one other element interposed therebetween.

The use of the terms "a" and "an" and "the" and similar referents in the context of describing the disclosure (especially in the context of the following claims) are to be construed to cover both the singular and the plural. Furthermore, the steps of all methods described herein can be performed in any suitable order unless otherwise indicated herein or otherwise clearly contradicted by context. The disclosure is not limited to the described order of the steps.

Expressions such as "in some embodiments of the disclosure" or "in an embodiment of the disclosure" appearing in various places in the disclosure do not necessarily indicate the same embodiment of the disclosure.

Some embodiments of the disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Furthermore, for example, the functional blocks of the disclosure may be implemented with any programming or scripting language. The functional blocks may be implemented in algorithms that are executed on one or more processors. Furthermore, the disclosure could employ any number of conventional techniques for electronics configuration, signal processing and/or control, data processing and the like. The words "mechanism," "element," "means," and "configuration" are used broadly and are not limited to mechanical or physical embodiments of the disclosure, but can include software routines in conjunction with processors, and the like.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

Throughout the disclosure, the expression "at least one of a, b or c" indicates only a, only b, only c, both a and b, both a and c, both b and c, all of a, b, and c, or variations thereof.

Furthermore, the terms such as "~portion", "~unit", "~module", and "~block" stated in the disclosure may signify a unit to process at least one function or operation and the unit may be embodied by hardware, software, or a combination of hardware and software.

In the disclosure, the term "user" refers to a person who controls the function or operation of an image generating device using the image generating device, and may include a viewer, an administrator, or an installation engineer.

The disclosure is described below in detail with reference to the accompanying drawings.

FIG. 1 is a diagram illustrating an example of generating a mosaic, according to an embodiment of the disclosure.

Referring to FIG. 1, according to an embodiment of the disclosure, a mosaic 140 may be generated using a base image 110 and a source image 120. The base image 110 may refer, for example, to a base image in generating the mosaic 140 and may be an image to be converted to a mosaic. The base image 110 may be a still image such a picture or a photo. The base image 110 may be a photo or a picture digitalized by a digital camera or a scanner or an image that is newly created using a program for drawing a picture. A user may create a new image by directly photographing an image using an electronic apparatus (not shown) for generating a mosaic according to an embodiment of the disclosure, or using a method of drawing a picture using a drawing program for example, Photoshop, and use the new image as the base image 110 The base image 110 may be an image that is received or downloaded from an external device or an external server and stored in the electronic apparatus.

The base image 110 may be divided into a plurality of sub-base images. The sub-base image may be referred to as a tile. Small sub-mosaic is generated in units of tiles, for example, in units of sub-base images, thereby the mosaic 140 is generated as a whole.

In FIG. 1, the base image 110 may be divided into a plurality of tiles, for example, N tiles. The tile may be an area including a certain number of pixels. The number of tiles or the size of a tile may be previously set, or a user may change the number of tiles or the size of a tile. A user may set to generate a mosaic to include a denser tiles or to include a small number of larger tiles in a mosaic, by adjusting the number of tiles or the size of a tile.

A sub-mosaic may be generated in units of tiles, for example, sub-base images. As a plurality of sub-mosaics gather, the mosaic 140 corresponding to the base image 110 is formed. As the number of sub-base images increases, sub-mosaics become denser and thus a photo or picture of the base image 110 that forms a base may be identified well. Conversely, as the number of sub-base images decreases, it becomes difficult to identify the photo or picture of the base image 110.

The source image 120 may be used to generate a sub-mosaic to be located in each sub-base image included in the base image 110. The source image 120 may be an image such as a photo or picture. The source image 120 may be an image that is photographed by a user using the electronic apparatus or newly created using a drawing program such as Photoshop. The source image 120 may be an image that is received from an external device or downloaded from an external server and stored in the electronic apparatus.

In an embodiment of the disclosure, the electronic apparatus for generating a mosaic may use an artificial intelligence (AI) technology. An AI technology may include machine learning (deep learning) and component technologies using the machine learning. The AI technology may include a set of algorithms for outputting output data corresponding to input data through a neural network 130, software for executing the set of algorithms, and/or hardware for executing the set of algorithms.

In an embodiment of the disclosure, the neural network 130 may generate the mosaic 140 from the base image 110 and the source image 120. The neural network 130 may select a certain one of a plurality of sub-base images included in the base image 110, for example a sub-base image 111. For convenience of explanation, the sub-base image 111 may be referred to as a first sub-base image. The neural network 130 may extract a feature value from the first sub-base image 111 that is selected.

The neural network 130 may select any one of a plurality of source images 120. In an embodiment of the disclosure, the source images 120 may be images set by a user, or images randomly selected by the neural network 130 from the images stored in the electronic apparatus. The neural network 130 may extract a feature value from the source image 120 that is selected.

The neural network 130 may generate a sub-mosaic to be located in the first sub-base image 111 using the feature value extracted from the first sub-base image 111 and the feature value extracted from the source image 120. For convenience of explanation, a sub-mosaic to be located in the first sub-base image 111 may be referred to as a first sub-mosaic.

The neural network 130 may randomly select one of the sub-base images, except the first sub-base image 111, among the sub-base images included in the base image 110. In an embodiment of the disclosure, the neural network 130 may select sub-base images in a set order or in a random order. For example, the neural network 130 may randomly select a sub-base image 112 from among the sub-base images. For convenience of explanation, the sub-base image 112 may be referred to as a second sub-base image.

In an embodiment of the disclosure, the neural network 130 may randomly select again a source image from the source images 120. In this state, the source image 120 selected by the neural network 130 may be identical to the previously selected source image or not. The neural network 130 may extract a feature value from each of the second sub-base image 112 and the source image 120 that is selected and generate a sub-mosaic, for example, a second sub-mosaic, to be located in the second sub-base image 112, using the extracted feature values. The neural network 130 repeats the above operation on each of N sub-base images included in the base image 110 to generate N sub-mosaics with respect to all N sub-base images included in the base image 110. The neural network 130 generates a single mosaic 140 by summing all of the generated N sub-mosaics.

Figure 2:
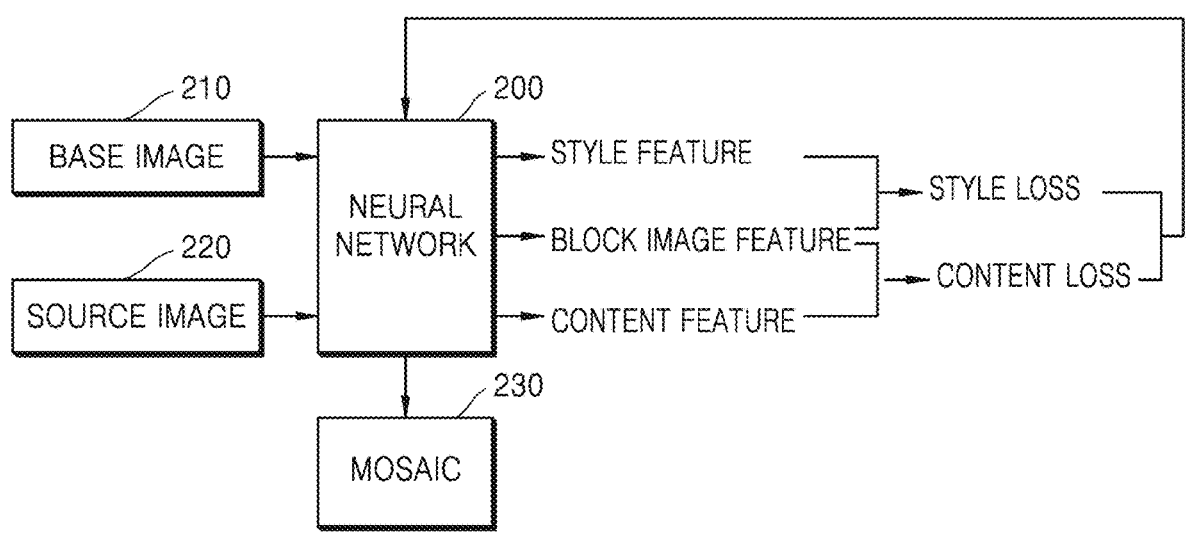
FIG. 2 is a block diagram illustrating example mosaic generation by a neural network, using features of a base image and a source image, according to an embodiment of the disclosure.

FIG. 2 is a block diagram illustrating example mosaic generation by a neural network, using the features of a base image and a source image, according to an embodiment of the disclosure.

Referring to FIG. 2, a base image 210 may be input to a neural network 200. The base image 210 may include a basic image or an image such as a picture with which a user wants to make a mosaic 230. The neural network 200 may select in a set order or randomly one of a plurality of sub-base images included in the base image 210.

A source image 220 may be input to the neural network 200. The neural network 200 may randomly select one of a plurality of images and use a selected image as the source image 220.

The base image 210 and the source image 220 may be sequentially input to the neural network 200 and respectively processed therein. The base image 210 and the source image 220 may be processed by being input together to the neural network 200.

In an embodiment of the disclosure, the neural network 200 may include, for example, an algorithm or a set of algorithms to implement the AI technology. The neural network 200 may generate the mosaic 230 by performing an image generation operation according to the AI technology using a neural network.

The neural network may include a plurality of layers from a low level layer to a high level layer. The neural network 200 may generate an output image through, for example, and without limitation, a convolution neural network (CNN) based neural network. The CNN-based neural network may include a plurality of convolution layers.

The neural network 200 may extract a content feature from one of two input images and a style feature from the other image, and generate an output image having a style converted to a style of the other image while maintaining a content of the one image.

The neural network 200 may select one sub-base image from the base image 210 and extract a feature from the selected sub-base image. In an embodiment of the disclosure, the neural network 200 may extract a style feature from the sub-base image.

The style feature may refer, for example, to a value representing a style of an image, which may be an intrinsic feature of an image or a painting style expressing a painting type. The style may indicate a style or type of picture drawing, such as watercolor, oil painting, ink painting, pointillism, and cubism, or may refer to the tendency and characteristics of a specific painter, such as, Van Gogh, Monet, Manet, Picasso, and the like. The style feature may include features classified by periods such as paintings from the Middle Ages, the Renaissance, the Modern, to the Contemporary, features classified by regions such as oriental painting, western painting, and the like, or features of painting styles such as impressionism, abstraction, realism, and the like. Furthermore, the style feature may include information on texture, color, atmosphere, contrast, gloss, or three elements of color, which are intensity, hue, and saturation.

The neural network 200 may randomly select one of a plurality of images and use a selected image as the source image 220. The neural network 200 may extract a feature from the source image 220. In an embodiment of the disclosure, the neural network 200 may extract a content feature from the source image 220. The content feature may include information about identity of a content included in an image, for example, a shape or a form.

The neural network 200 may obtain a feature of an output image to be generated. The feature of an output image may be necessary for generating a sub-mosaic to replace the sub-base image.

In an embodiment of the disclosure, the neural network 200 may be a pre-trained model to generate an output image having a feature such that a sum of a style loss and a content loss is minimized and/or reduced. In other words, the neural network 200 may extract a feature or a feature map from a source image and a sub-base image, which are input, and generate a sub-mosaic by modifying a content feature of the source image based on the feature of the sub-base image. The generated sub-mosaic may have the style feature of the sub-base image and the content feature of the source image.

The style loss may be obtained from the style feature and the output image feature. The style loss may be calculated using a matrix obtained with respect to feature or a feature map, extracted from one or more layers of a plurality of layers included in the neural network 200.

The neural network 200 may include a plurality of layers, and each of the layers may obtain a feature value from the sub-base image and compare the obtained feature value with the feature of the output image value to calculate a difference value therebetween, and thus the style loss may be obtained from a value obtained by adding a weight to the difference value for each layer and summing the weighted difference values. The neural network 200 may receive again an input of the style loss as a feed forward.

For example, the neural network 200 may extract a feature value at a certain layer from the sub-base image, considering a relationship with other layers. The neural network 200 may obtain a matrix using the extracted feature value. The neural network 200 may extract a feature value from an image to be output at the same certain layer, considering a relationship with other layers, and obtain a matrix using an extracted feature value. The neural network 200 may obtain a feature value difference between the sub-base image and the output image, for each identical layer, using a matrix obtained for the sub-base image and a matrix obtained for the output image, obtain a weight value by applying a weight to each layer, and obtain the style loss by summing all weighted values.

In another example, the neural network 200 may obtain the style loss of the sub-base image and the output image using a matrix extracted from only a certain low level layer of a plurality of layers. This is because, in general, as the depth of a layer increases, information of a pixel level disappears, and thus style information may be extracted from the low level layer.

The neural network 200 may obtain a content loss from the content feature and the feature of the output image. The content loss may be obtained using a feature map of a high level layer where abstraction of information is much performed. This is because identity, for example, a shape, of an input image is maintained in a he high level layer. The neural network 200 may obtain a content loss using a difference between the feature map of the source image and the feature map of the output image, which are extracted from a certain high level layer of a plurality of layers included in a neural network. The neural network 200 may receive an input of the content loss again.

The neural network 200 may optimize pixels of an output image by performing the above process several times such that the sum of the style loss and the content loss is minimized and/or reduced, thereby obtaining a desired final output image and using the obtained image as a sub-mosaic. The generated sub-mosaic may be an image having a style feature of the sub-base image 210 and a content feature of the source image 220 together. The neural network 200 may generate the mosaic 230 by performing the above process on all sub-base images.

Figure 3:
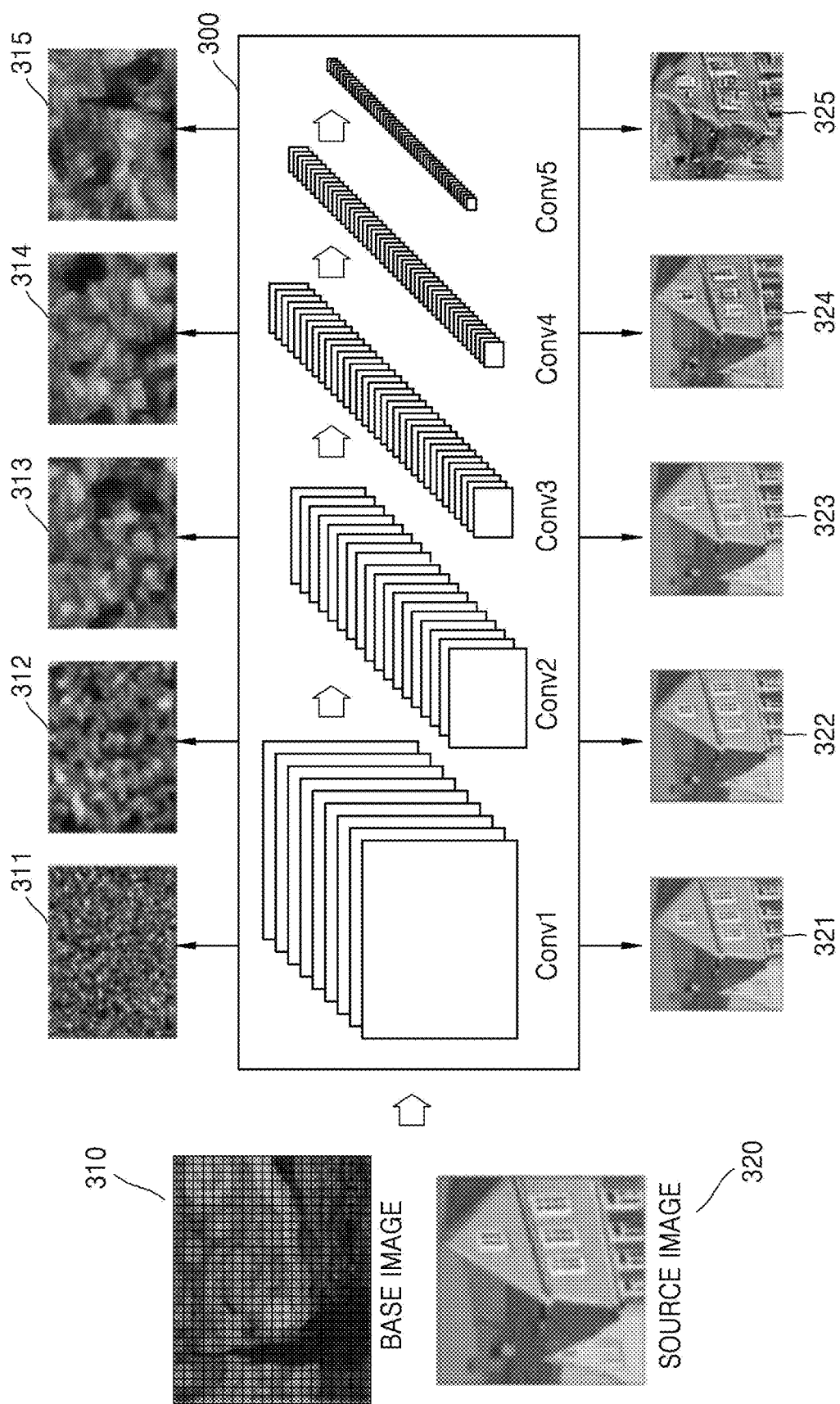
FIG. 3 is a diagram illustrating example extraction of features from an image by a neural network according to an embodiment of the disclosure.

FIG. 3 is a diagram illustrating example extraction of features from an image by a neural network 300 according to an embodiment of the disclosure. Referring to FIG. 3, the neural network 300 may, for example, and without limitation, include a CNN-based neural network such as a convolution neural network (CNN), a deep convolution neural network (DCNN), a Capsnet neural network, or the like. The CNN-based neural network may introduce the concept of a filter for filtering a specific region only and convolute pieces of information in the filter to create a new feature map, when a correlation between pieces of information included in an image is local.

The neural network 300 of FIG. 3 may include, for example, a DCNN having a plurality of depths. In other words, the neural network 300 may include a plurality of internal layers performing operations. When the depth of a neural network performing an operation increases, the neural network may be classified as a deep neural network (DNN). A DNN operation may include a CNN operation or the like.

A pooling layer may be disposed following a convolution layer. The convolution layer may refer, for example, to a layer of pieces of data generated according to the convolution operation, and the pooling layer is a layer to decrease the number or size of data through an operation of subsampling or pooling. Pieces of data indicating the features of an input image, for example, a feature map, are generated while passing through the convolution layer and the pooling layer.

The depths of a convolution layer and a pooling layer may be variable. Furthermore, different pieces of feature data may be extracted according to the depths of a convolution layer and a pooling layer. For example, as the depths of a convolution layer and a pooling layer increase, pieces of information indicating features of an input image may have a denser form. The depth and form may be variously designed considering accuracy of results, reliability of results, operation processing speed and capacity of a processor, and the like.

In FIG. 3, when an image is input, the neural network 300 may extract a feature map from each layer with respect to the input image. As the depth of a layer filter varies, an output feature map may also vary. The depth of each layer filter of the neural network 300 of FIG. 3 gradually increases from the left to the right. When a base image 310 is input from the left of the neural network 300, the neural network 300 may extract a style feature from a sub-base image while one of a plurality of tiles included in the base image 310, that is, one sub-base image, passes through each layer. In FIG. 3, reference numerals 311, 312, 313, 314, and 315 denote feature maps extracted by the neural network 300 as a sub-base image passes through each layer. It can be seen that the feature maps 311, 312, 313, 314, and 315 output from the neural network 300 are deformed to an image having the same style as if the sub-base image is enlarged while passing through a layer, not to the entire layout information of the sub-base image.

The neural network 300 may use, as a style feature, a value output through a single layer of the layers included in the neural network 300. The neural network 300 may use a feature map extracted from a plurality of layers, as a style feature, considering a correlation of the feature map of the layers, not a single layer.

Similarly, when a source image 320 is input, the neural network 300 may extract a content feature from the source image 320 as the source image 320 passes through each layer. In FIG. 3, the neural network 300 extracts feature maps 321, 322, 323, 324, and 325 by reconfiguring the source image 320 by allowing the source image 320 to pass through each layer in a direction from the left to the right. For a low layer, feature maps 321, 322, and 323, which are almost the same as the source image 320 that is input, are output. As the depth of a layer increases, information of a pixel level disappears, and thus images 324 and 325 in a state in which semantic information of the source image 320 is maintained, are output. Accordingly, the neural network 300 may extract a content feature from a layer with a deep layer.

The neural network 300 may obtain, using an output image, a style loss by comparing the style features extracted from layers with a small depth of the output image and the sub-base image, and a content loss by comparing the content features extracted from layers with a large depth from the output image and the source image. The neural network 300 may generate an output image having minimum content loss and style loss and use the generate output image as a sub-mosaic.

Figure 4:
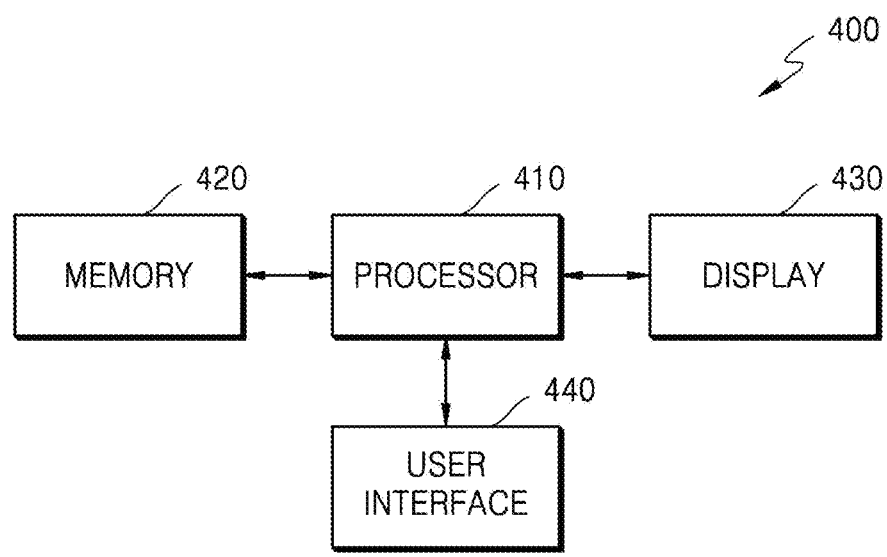
FIG. 4 is a block diagram illustrating an example mosaic generation apparatus according to an embodiment of the disclosure.

FIG. 4 is a internal block diagram illustrating an example mosaic generation apparatus 400 according to an embodiment of the disclosure. Referring to FIG. 4, the mosaic generation apparatus 400 may include a processor (e.g., including processing circuitry) 410, a memory 420, a display 430, and a user interface (e.g., including interface circuitry) 440.

In an embodiment of the disclosure, the mosaic generation apparatus 400 may be implemented by various electronic apparatuses capable of generating a mosaic. The mosaic generation apparatus 400 may include, for example, a fixed type or a mobile type. For example, the mosaic generation apparatus 400 may include, for example, and without limitation, at least one of a desktop computer, a digital TV, a smartphone, a tablet personal computer (PC), a video phone, an e-book reader, a laptop PC, a netbook computer, a digital camera, a personal digital assistant (PDA), a portable multimedia player (PMP), a camcorder, a navigation device, a wearable device, a smart watch, or the like.

The processor 410 may include various processing circuitry and control the overall operation of the mosaic generation apparatus 400. The processor 410 may control the mosaic generation apparatus 400 to operate by executing one or more instructions stored in the memory 420.

In an embodiment of the disclosure, the mosaic generation apparatus 400 may use the AI technology including machine learning and component technologies using the machine learning. To this end, the processor 410 may use a neural network including an algorithm or a set of algorithms to implement the AI technology. The neural network may receive input data, perform an operation for the above-described analysis and classification, and output result data.

The neural network needs to be trained in order to accurately output the result data corresponding to the input data. The "training" may refer, for example, to training a neural network to discover or learn by itself a method of inputting various pieces of data to a neural network and analyzing the input data, a method of classifying the input data, and/or a method of extracting from the input data a feature needed for generating the result data. An AI model of desired characteristics may be created by applying a learning algorithm to a number of learning data through learning. Such learning may be performed in a device itself where AI is performed, for example, the mosaic generation apparatus 400, or through a separate server/system.

A learning algorithm may include, for example, a method of training a certain target device, for example, a robot, using a plurality of learning data, to make a decision or prediction by itself. Examples of the learning algorithm may include, without limitation, supervised learning, unsupervised learning, semi-supervised learning, reinforcement learning, or the like, and the learning algorithm of the disclosure is not limited to the above-described examples.

In an embodiment of the disclosure, when generating one output image from two input images, the neural network may be trained to extract a style feature from one of the two images and a content feature from the other image and generate an output image where the style feature and the content feature are mixed with each other. The neural network may be trained to receive an input of a difference value between the style feature extracted from the first image and the style feature of the output image, and generate or deform the output image using the received difference value such that the difference value between the style feature of the first image and the style feature of the output image is minimized and/or reduced. Furthermore, the neural network may be trained to receive an input of a difference value between the content feature extracted from the second image and the content feature of the output image, and generate or deform the output image using the received difference value such that the difference value between the content feature of the second image and the content feature of the output image is minimized and/or reduced. Consequently, the neural network may be previously trained to generate an output image having a style feature of one image and a content feature of the other image, with respect to two images.

The processor 410 may control the mosaic generation apparatus 400 to generate a mosaic by processing input data using an AI model. In an embodiment of the disclosure, the processor 410 may generate a mosaic with respect to a base image selected by a user. The user may select, as a base image, one of a plurality of images stored in the memory 420, or an image received or downloaded from an external device. The processor 410 may divide the base image selected by the user into a plurality of sub-base images and randomly select one of the sub-base images. The processor 410 may extract a feature value or a feature map from the selected one sub-base image for each layer included in the neural network. The processor 410 may use a feature regarding the style only of the feature values for each layer extracted with respect to the sub-base image, or extract and use only a feature regarding the style for each layer, for generating a sub-mosaic.

As described above, the feature regarding the style may be obtained considering a correlation between the feature maps of the respective layers included in the neural network. In an embodiment of the disclosure, the feature regarding the style may be extracted from one or a plurality of layers with a small depth among the layers.

The feature regarding the style may include, for example, and without limitation, a value expressing the style of an image, and may be a painting style representing each specific era or region when a picture was drawn, a painting style representing the painter's tendency and characteristics, and the like, or the texture, atmosphere, contrast, gloss, intensity, hue, or saturation of an image, or the like. The processor 410 may generate a sub-base mosaic using style information extracted from the sub-base image. In the following description, feature information extracted by the processor 410 from the sub-base image to generate a sub-base mosaic may be referred to as a first feature value.

In an embodiment of the disclosure, the processor 410 may generate a sub-mosaic in a random order with respect to a plurality of sub-base images. For example, the processor 410 may randomly select one of sub-base images that are not selected and may generate a sub-mosaic with respect to the selected sub-base image.

In an embodiment of the disclosure, the processor 410 may randomly select one of a plurality of source images. The source image may be selected from a plurality of images previously stored in the memory 420 or randomly selected from images received or downloaded from an external device. In an embodiment of the disclosure, the processor 410 may iteratively select the same source image when sub-mosaics are generated with respect to different sub-base images. Even when the processor 410 iteratively select and use the same source image to generate sub-mosaics with respect to different sub-base images, the sub-mosaics generated using the sub-base image and the source image may be different from each other. In other words, when the sub-base images are not identical to each other, the feature values of the respective sub-base images are different from each other. Accordingly, even when sub-mosaics are generated using the same source image, the generated sub-mosaics may have different feature values.

The processor 410 may extract a feature value from one source image selected from a plurality of source images. In this state, the processor 410 may extract from a source image a content feature to identify a source image, for example, the shape or form of the source image.

The content feature may be extracted from a layer of a specific level of the layers included in a neural network. Alternatively, in an embodiment of the disclosure, a feature regarding a content may be extracted from one or a plurality of upper level layers with a large depth among the layers.

The processor 410 may generate a sub-base mosaic using content information extracted from the source image. In the following description, feature information extracted by the processor 410 from the source image to generate a sub-base mosaic is referred to as a second feature value.

The processor 410 may generate a sub-mosaic corresponding to a selected sub-base image using the first feature value extracted from the selected sub-base image and the second feature value extracted from the selected source image. The processor 410 may generate sub-mosaics corresponding to all of a plurality of sub-base images, and generate a mosaic corresponding to the entire base image using the generated sub-mosaics.

The memory 420 may store at least one instruction. The memory 420 may store at least one program executed by the processor 410. Furthermore, the memory 420 may store data that is input to the mosaic generation apparatus 400 or output from the mosaic generation apparatus 400.

In an embodiment of the disclosure, the memory 420 may store the above-described AI model. The memory 420 may include at least one type of storage media such as, for example, and without limitation, a flash memory type, a hard disk type, a multimedia card micro type, a card type memory, for example, SD or XD memory, etc., random access memory (RAM), static RAM (SRAM), read-only memory (ROM), electrically erasable programmable ROM (EEPROM), programmable ROM (PROM), magnetic memory, magnetic disk, optical disk, and the like.

The memory 420 may store a media signal. The media signal may include an image such as a picture or a photo to be used as the base image or the source image. Furthermore, the media signal may include a video signal, a text signal, or the like. The media signal may be an image such as a photo or a picture that is generated by being photographed or edited by a user using the mosaic generation apparatus 400, or an image that is downloaded from the external device or received from an external medium.

In an embodiment of the disclosure, the processor 410 may be provided with another memory (not shown) in the processor 410. The processor 410 may store one or more instructions in a memory provided therein and control the above-described operations to be performed by executing the one or more instructions stored in the memory. In other words, the processor 410 may perform a certain operation by executing at least one instruction or program stored in the memory provided in the processor 410 or a memory 210.

According to an embodiment of the disclosure, the display 430 may output an image such as a picture or a photo, a video signal, a text signal, or the like. When the display 430 is implemented by a touch screen, the display 430 may be used as an input device other than an output device. For example, the display 430 may include, for example, and without limitation, at least one of a liquid crystal display, a thin film transistor-liquid crystal display, an organic light-emitting diode, a flexible display, a three-dimensional (3D) display, an electrophoretic display, or the like.

In an embodiment of the disclosure, the display 430 may output an image such as a plurality of pictures or photos to be used as the base image. The display 430 may output an interface screen. The user may select a desired image of a plurality of images to be the base image using the interface screen. The processor 410 may generate a mosaic by randomly selecting a source image with respect to the base image selected by the user. The display 430 may output the mosaic generated by the processor 410. In an embodiment of the disclosure, the processor 410 may generate a plurality of mosaics with respect to the same base image. As the processor 410 randomly selects and uses the sub-base image and the source image, a plurality of mosaics may be generated with respect to the same base image. When the processor 410 generates a plurality of mosaics, the display 430 may output a plurality of mosaics to the display 430 and an interface screen through which a user selects one of the mosaics.

The user interface 440 may include various interface circuitry and receive a user input to control the mosaic generation apparatus 400. The user interface 440 may include various types of user input devices including a touch panel that senses a user's touch, a button that receives a user's push operation, a wheel that receives a user's rotation operation, a keyboard, a dome switch, a microphone for speech recognition, a motion detection sensor for sensing a motion, or the like, but the disclosure is not limited thereto. Furthermore, when the mosaic generation apparatus 400 is manipulated by a remote controller (not shown), the user interface 440 may receive a control signal received from the remote controller.

The user may select a base image for generating a mosaic through the user interface 440. Furthermore, the user may select, through the user interface 440, whether the processor 410 may generate one or a plurality of mosaics from one base image. The processor 410 may generate one or a plurality of mosaics according to a user's control signal. When a plurality of mosaics are output, the user may select one of the output mosaics to be stored in the mosaic generation apparatus 400 or to be transmitted to the external device.

Figure 5:
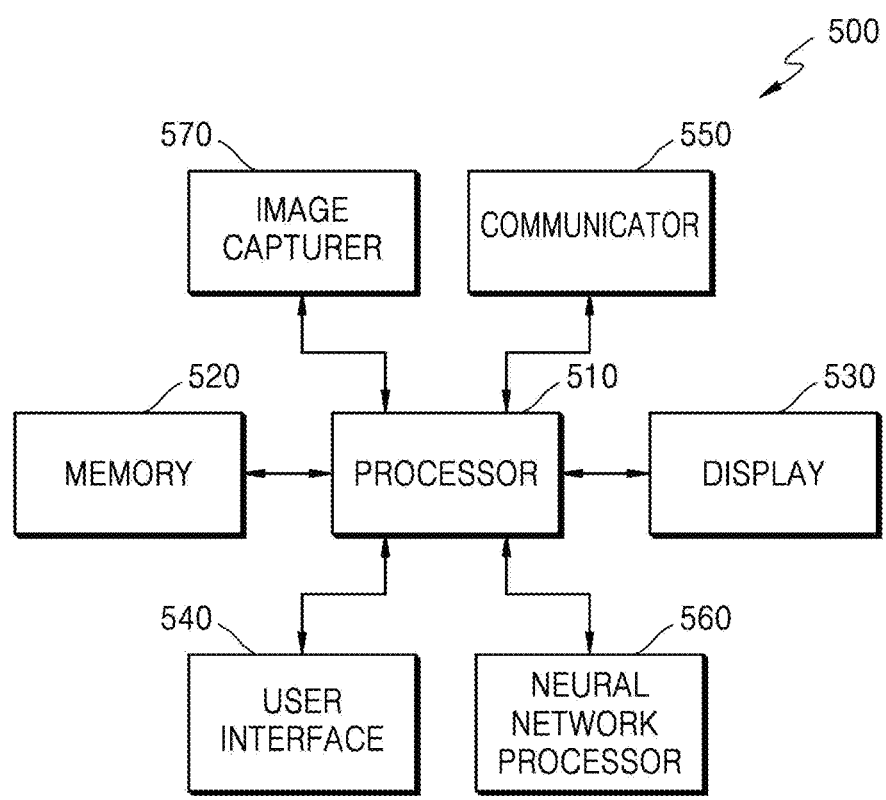
FIG. 5 is a block diagram illustrating an example mosaic generation apparatus according to another embodiment of the disclosure.

FIG. 5 is a block diagram illustrating an example mosaic generation apparatus 500 according to an embodiment of the disclosure. The mosaic generation apparatus 500 of FIG. 5 may be an apparatus including the mosaic generation apparatus 400 of FIG. 4. In the description of the mosaic generation apparatus 500 of FIG. 5 below, redundant description with FIG. 4 may not be repeated.

The mosaic generation apparatus 500 of FIG. 5 may further include a communicator (e.g., including communication circuitry) 550, a neural network processor (e.g., including processing circuitry) 560, and an image capturer (e.g., including image capturing circuitry) 570, compared with the mosaic generation apparatus 400 of FIG. 4.

The communicator 550 may include various communication circuitry and communicate with external devices (not shown) via a wired or wireless network. For example, the communicator 550 may transceive signals with the external device via a wired or wireless network under the control of a processor 510. The external device may include, for example, a database or an electronic apparatus for supplying a media signal such as an image output through a display 530 or an information storage medium such as a universal serial bus (USB). Furthermore, the external device may include a server, a server system, or a server-based device that process data transmitted/received to and from the communicator 550. Furthermore, the external device may be a display device which outputs a mosaic generated by the mosaic generation apparatus 500 on a screen.

The communicator 550 may include at least one communication module including communication circuitry, such as, for example, and without limitation, a short-range communication module, a wired communication module, a mobile communication module, a broadcast receiving module, or the like. The communication module may include a communication module capable of performing data transmission and reception through a network that conforms to communication standards, such as, a tuner for receiving broadcast, Bluetooth, wireless LAN (WLAN) Wi-Fi, wireless broadband (Wibro), world interoperability for microwave access (Wimax), CDMA, WCDMA, or the like etc.

In an embodiment of the disclosure, the communicator 550 may receive an image such as a picture or painting from the external device. In an embodiment of the disclosure, the communicator 550 may receive various instructions, an algorithm used by the processor 510, or an AI model implemented by algorithms, from the external device. The communicator 550 may transit the mosaic generated by the processor 510 to the external device.

The image capturer 570 may include various image capturing circuitry and generate an image by photographing a subject and perform signal processing on the image. In an embodiment of the disclosure, the image capturer 570 may include, for example, a camera (not shown). The camera may form an image based on information about a subject on an image sensor (not shown) such as a charge coupled device (CCD) or a complementary metal-oxide semiconductor (CMOS), and the image sensor may convert light coming in through the camera to electrical signals. The image capturer 570 may perform, on the photographed image, one or more signal processing of auto exposure (AE), auto white balance (AWB), color recovery, correction, sharpening, gamma, and lens shading correction. An image photographed by a user using the image capturer 570 may be edited later using various applications such as Photoshop. An image photographed using the image capturer 570 or an image edited later may be stored in a memory 520, or used as the source image or the base image.

The mosaic generation apparatus 500 of FIG. 5 may further include the neural network processor 560, compared with the mosaic generation apparatus 400 of FIG. 4. The mosaic generation apparatus 500 of FIG. 5, may perform an operation through the neural network processor 560, other than or together with the processor 510, not via a neural network.

The neural network processor 560 may include various processing circuitry and perform an operation via a neural network by performing one or more instructions. For example, the neural network processor 560 may divide a base image that a user desires into a plurality of sub-base images using an AI model, and extract a style feature value from each sub-base image. The neural network processor 560 may randomly select one of a plurality of source images and extract a content feature value regarding the selected source image. The neural network processor 560 may generate a sub-mosaic corresponding to a sub-base image using a style feature value extracted from the sub-base image and a content feature value extracted from the source image.

The display 530 may output a mosaic that the neural network processor 560 generates using the AI model. When the neural network processor 560 generates a plurality of mosaics with respect to the same base image, the display 530 may output a plurality of mosaics so that a user selects a desired mosaic.

Figure 6:
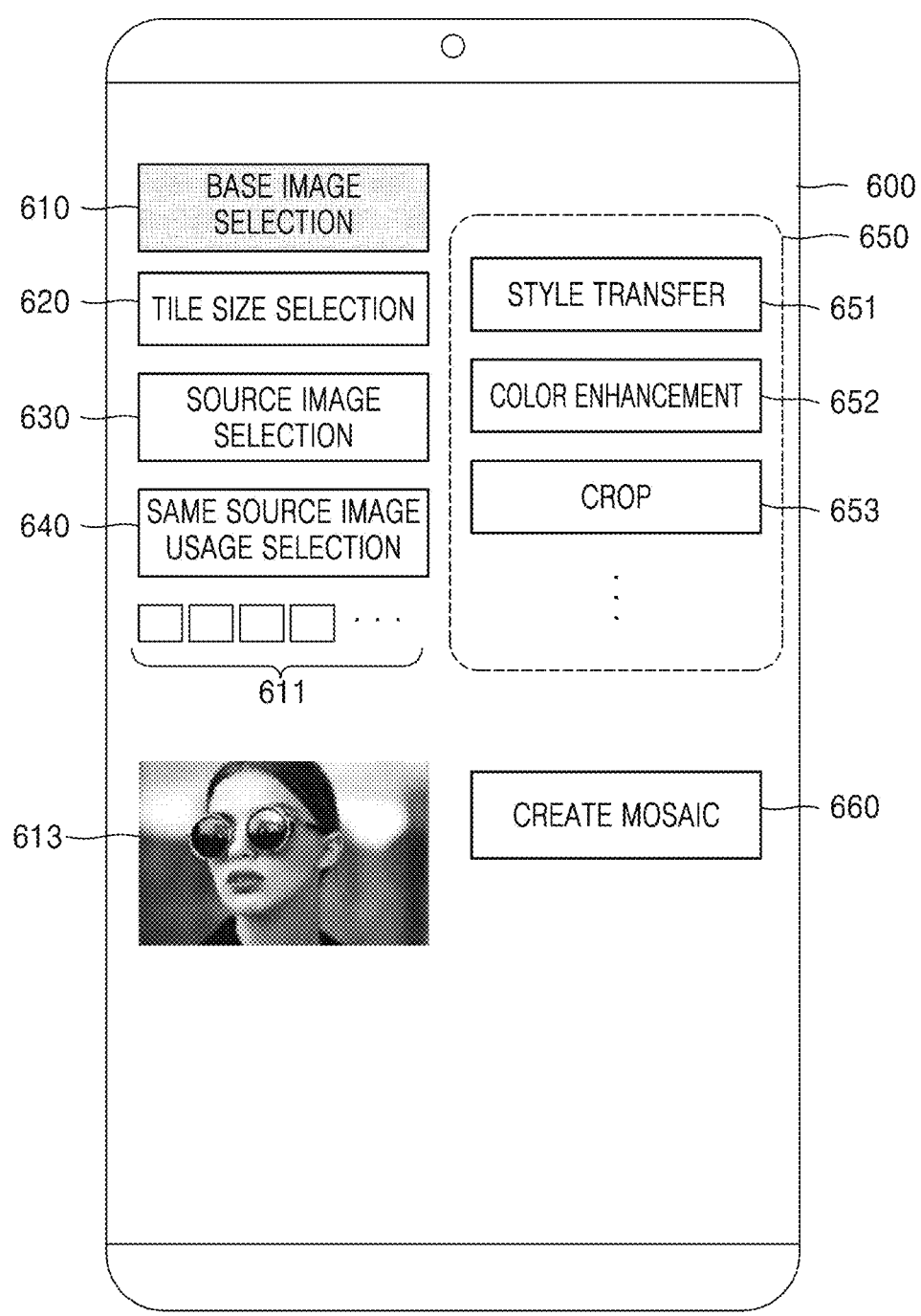
FIG. 6 is a diagram illustrating an example user interface for generating a desired mosaic using a mosaic generation apparatus, according to an embodiment of the disclosure.

FIG. 6 is a diagram illustrating an example user interface used by a user to generate a desired mosaic using a mosaic generation apparatus, according to an embodiment of the disclosure. Referring to FIG. 6, a user may generate a mosaic with respect to a desired image using a mosaic generation apparatus. The mosaic generation apparatus may generate and output an interface screen 600 for generating a mosaic according to a user's command.

As described above, the mosaic generation apparatus may be implemented by various electronic apparatuses capable of generating a mosaic and may include, for example, and without limitation, a desktop computer, a digital TV, a smartphone, a tablet PC, a laptop PC, a netbook computer, a PDA, a PMP, and the like.

The user may select or input various control information output to the interface screen 600 for generating a mosaic using various types of user input devices.

The interface screen 600 for generating a mosaic may include, for example, buttons for selecting various pieces of control information such as base image selection 610, tile size selection 620, source image selection 630, same source image usage selection 640, image editing tool 650, and create mosaic 660.

The base image selection 610 is information provided to select a desired image of images that are previously stored in the mosaic generation apparatus or received in real time from the external device to be used by the user. When the user selects a button for the base image selection 610 using a mouse, a finger, or a pad, a plurality of images 611 that the user can select may be output to the interface screen 600 for generating a mosaic. The user may select a desired image therefrom. The image selected by the user may be output to the interface screen 600 for generating a mosaic in an enlarged size 613.

In an embodiment of the disclosure, the user may select or directly input the size of a tile or the number of tiles using a button for the tile size selection 620. The tile size may be used to determine the number of divided parts of a single base area.

Although the mosaic generation apparatus may randomly select and use a source image, the source image may be selected by the user through the interface screen 600 for generating a mosaic. In this example, the user may select the source image using a button for the source image selection 630. A plurality of source images are needed to generate a mosaic with respect to a single base image. The user may select a plurality of source images by selecting a certain folder and using images in the folder as a source image. The user may select all of the source images or the user may set the mosaic generation apparatus such that, while some source images are selected by the user, the rest are randomly selected by the mosaic generation apparatus. The user may set the mosaic generation apparatus such that the mosaic generation apparatus selects all necessary source images.

The source image may or may not be used repeatedly. When the user generates a mosaic using a button for the same source image usage selection 640, it may be selected whether to repeatedly use the same source image with respect to different tiles, that is, different sub-base images. In an embodiment of the disclosure, even when a sub-mosaic is generated using the same source image with respect to different sub-base images, the sub-mosaic has a feature of the sub-base image, and thus a sub-mosaic generated corresponding to the different sub-base images may have a different feature.

The image editing tool 650 may include various image editing tools such as, for example, and without limitation, style transfer 651, color enhancement 652, crop 653, and the like. When generating a mosaic using a button for the style transfer 651, the user may additionally reflect a desired specific style. For example, the user may change a sense of color using a button for the color enhancement 652. The user may select and use only a specific part of an image using a button for the image crop 653. This is simply an example, and the image edition tool 650 may include various types of tools for image edition. The user may generate a mosaic by selecting a button for the create mosaic 660.

Figure 7:
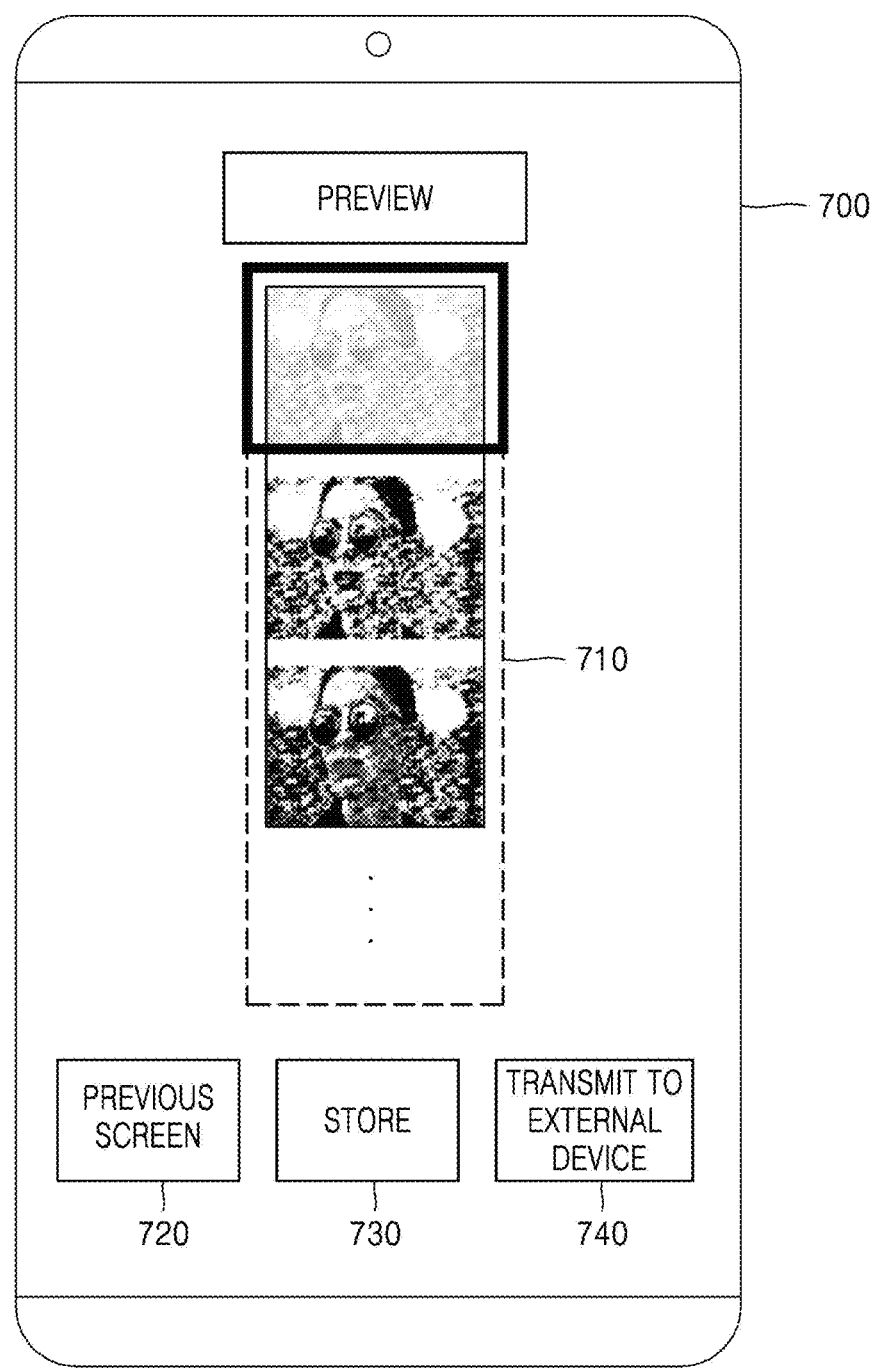
FIG. 7 is a diagram illustrating an example user interface to be output based on a user generating a mosaic using a mosaic generation apparatus, according to an embodiment of the disclosure.

FIG. 7 is a diagram illustrating an example user interface output when a user generates a mosaic using a mosaic generation apparatus, according to an embodiment of the disclosure Referring to FIG. 7, when a user selects buttons output on the interface screen 600 for generating a mosaic or inputs desired information, as shown in FIG. 6, and then selects the button for the create mosaic 660, a user interface screen 700 as shown in FIG. 7 may be output. FIG. 7 illustrates that a plurality of mosaics 710 generated with respect to the same base image is output.

In an embodiment of the disclosure, when a mosaic is generated from the same base image, the mosaic generation apparatus may generate a plurality of mosaics different from one another by selecting different source images for use. In other words, as the mosaic generation apparatus randomly selects and use a source image, even when a mosaic is generated with respect to the same base image, different mosaics may be generated according to the content of the selected source image. Furthermore, as the mosaic generation apparatus may randomly set an order of selecting tiles in a base image and source images to be used for the respective tiles, even when the same base image and the same source image are used, generated mosaics may vary depending on a selection order of tiles in the base image and a selection order of the source image.

The user may select a desired mosaic from among the output mosaics 710. The user may select a button for store 730 to store a selected mosaic in the mosaic generation apparatus. When the user generates a mosaic again, the user selects a button for previous screen 720 so that the interface screen 600 for generating a mosaic is output again.

In an embodiment of the disclosure, using a button for transmit to external device 740, the user may transmit, for use, a mosaic selected by the user to a display device such as an external television.

Figure 8:
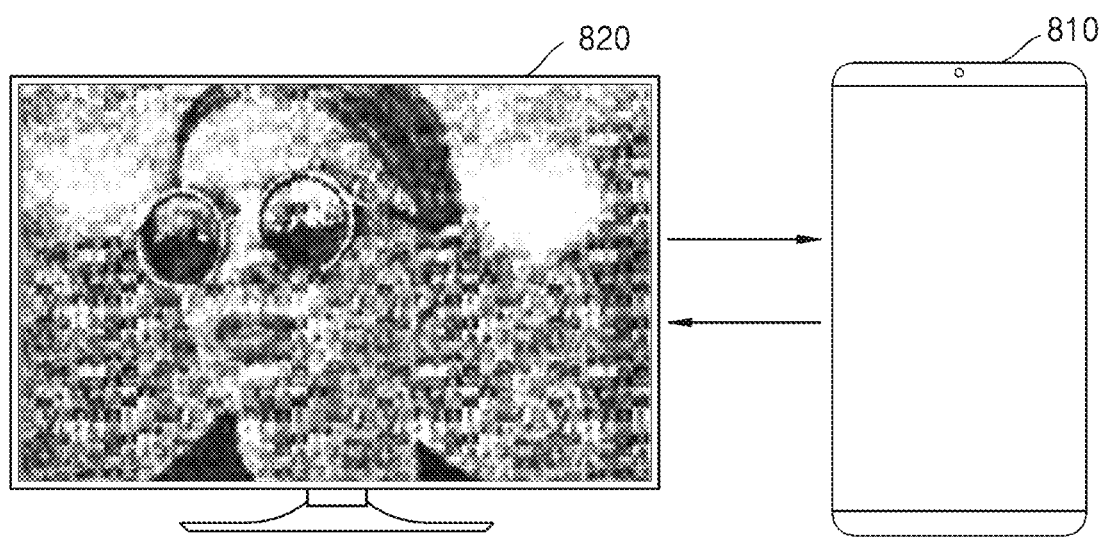
FIG. 8 is a diagram illustrating an example of a display device receiving a mosaic from a mosaic generation apparatus and outputting a received mosaic on a screen, according to an embodiment of the disclosure.

FIG. 8 is a diagram illustrating an example of a display device receiving a mosaic from a mosaic generation apparatus 810 and outputting a received mosaic on a screen, according to an embodiment of the disclosure. Referring to FIG. 8, the mosaic generation apparatus 810 may be implemented by various devices such as, for example, and without limitation, a personal computer, a server computer, a laptop computer, a portable electronic apparatus, and the like. The mosaic generation apparatus 810 may transit a generated mosaic externally to a display device 820 via a wired or wireless communication network. The display device 820 may be implemented by various devices such as a computer or television including a display, a portable electronic apparatus, and the like.

The display device 820 may include, for example, a product to be used as a picture frame for displaying a certain image such as a photo or a famous painting. The display device 820 may output a certain image, for example, a famous painting or a photo, unless the user is doing some work or using a content through the display device 820. In this example, the user may use the display device 820 as a famous picture frame or a large photo frame. The user may allow a desired image to be displayed through the display device 820, considering preference or an atmosphere of a place where the display device 820 is located.

In an embodiment of the disclosure, the user may generate a desired mosaic using the mosaic generation apparatus 810 and transmit a generated mosaic to the display device 820, thereby allowing the desired mosaic to be used as a frame through the display device 820. The user may upload a mosaic generated using the mosaic generation apparatus 810 to a server (not shown) or the like. The user may download and output, for use, a mosaic stored in the server by accessing the server using the display device 820.

Figure 9:
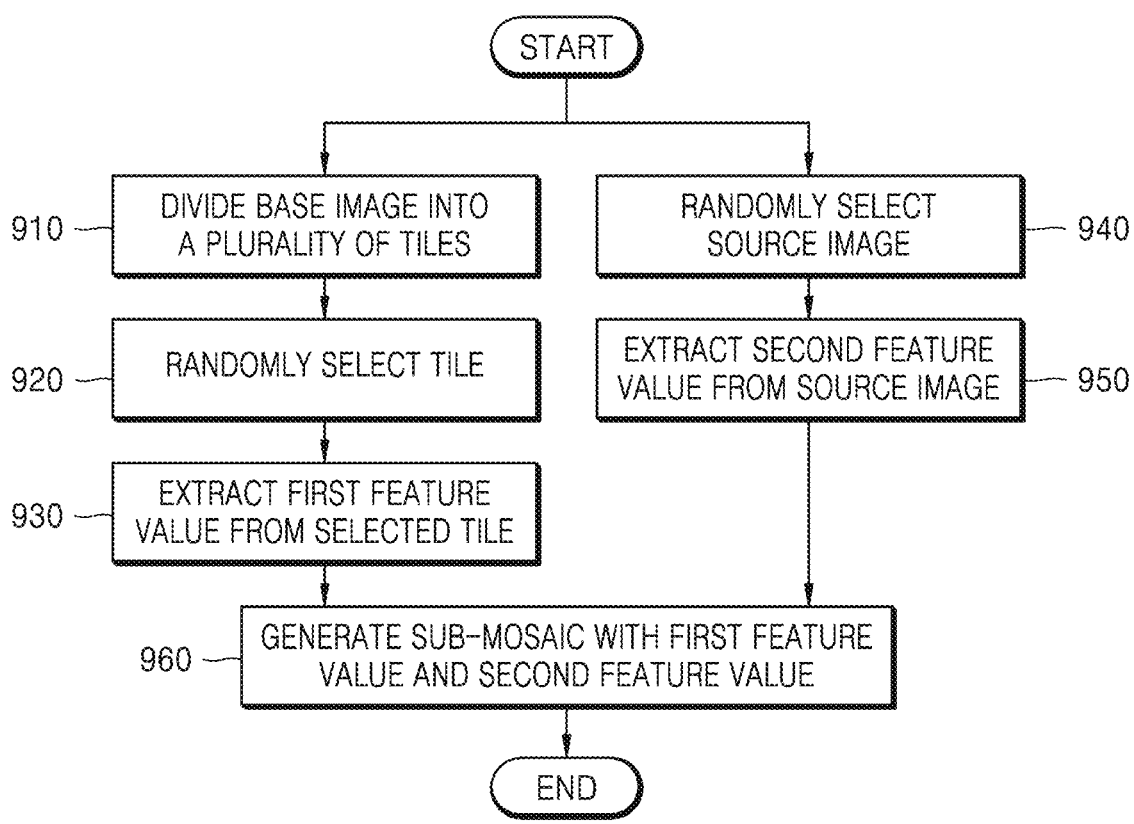
FIG. 9 is a flowchart illustrating an example mosaic generation method according to an embodiment of the disclosure.

FIG. 9 is a flowchart illustrating an example mosaic generation method according to an embodiment of the disclosure. Referring to FIG. 9, the mosaic generation apparatus 400 may divide a base image into a plurality of tiles (operation 910). The user may select the number of tiles divided from the base image or the size of a tile. The mosaic generation apparatus 400 may randomly select one of a plurality of tiles (operation 920). The mosaic generation apparatus 400 may extract a first feature value from a selected tile (operation 930). The first feature value may be a feature used when generating a sub-mosaic that is extracted from the file by the mosaic generation apparatus 400. In an embodiment of the disclosure, the first feature value may be a style feature of the base image.

The mosaic generation apparatus 400 may randomly select a source image (operation 940). The mosaic generation apparatus 400 may extract a second feature value from a selected source image (operation 950). The second feature value may be a feature used when generating a sub-mosaic that is extracted from the source image by the mosaic generation apparatus 400. In an embodiment of the disclosure, the second feature value may be a content feature of the source image.

The mosaic generation apparatus 400 may generate a sub-mosaic using the first feature value and the second feature value (operation 960). The mosaic generation apparatus 400 may randomly select one of tiles that are not selected from the base image, and repeat the same process. The mosaic generation apparatus 400 may select and use again the source image that has been used for generating a sub-mosaic corresponding to the previous tile. The mosaic generation apparatus 400 may generate sub-mosaics for all tiles and generate a mosaic with respect to the entire base image using the generated sub-mosaics.

Figure 10:
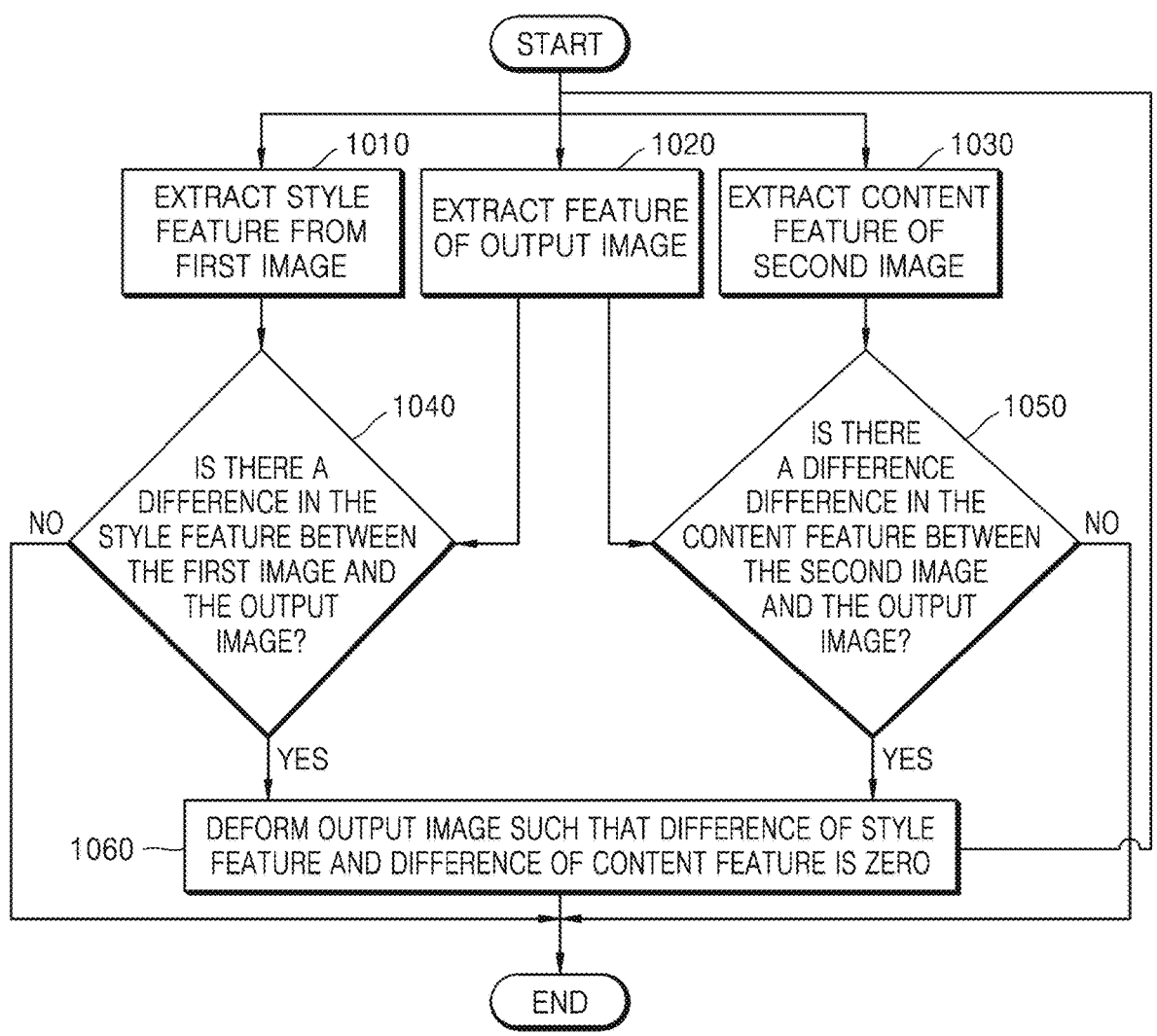
FIG. 10 is a flowchart illustrating an example method of training a neural network to generate a mosaic, according to an embodiment of the disclosure.

FIG. 10 is a flowchart illustrating an example method of previously training a neural network to generate a mosaic, according to an embodiment of the disclosure. In an embodiment of the disclosure, the processor 410 included in the mosaic generation apparatus 400 may generate a mosaic using a neural network. The neural network may be previously trained to output an output image in which a sum of a style loss and a content loss is minimized and/or reduced. To this end, the neural network may extract a feature of an output image to be generated using the two images that are input (operation 1020).

The neural network may extract a style feature from a first image that is input (operation 1010), and compare the extracted style feature with a style feature of an output image to be output, and identify if there is a difference between them (operation 1040). The neural network may include a plurality of layers, and each layer may extract a different feature value with respect to the first image. The neural network may obtain a difference between the feature value of the first image and a feature value of the output image, which are extracted from the same layer. The neural network may calculate a loss between the feature values of the first image and the output image in each of the layers, and obtain a style loss from a value that is obtained by adding a weight to each calculated loss and summing the weighted losses. The neural network 200 may receive again an input of a style loss as a feed forward. When there is a difference between the style features of the first image and the output image ("Yes" in operation 1040), the neural network may deform the output image so that the difference is 0 (operation 1060).

The neural network may extract a content feature from a second image that is input (operation 1030). The neural network may identify whether there is a difference between the content feature and the feature of the second image (operation 1050), and may obtain a content loss from the content feature and the feature of the output image The content loss may be obtained using a feature map of a high level layer where abstraction of information is much performed. The neural network may obtain a content loss using a difference between the feature map of the source image and the feature map of the output image, which are extracted from a certain high level layer of a plurality of layers included in a neural network. The neural network may receive an input of the content loss again.

When there is a difference between the content feature of the second image and the content feature of the output image ("Yes" in operation 1050), the neural network may deform the output image so that the difference is zero (operation 1060). The neural network may be trained such that the output image is deformed by performing the process several times so that the sum of the style loss and the content loss is minimized and/or reduced. The deformed output image may be an image having both of the style feature of a sub-base image and the content feature of the source image.

A function related to AI according to the disclosure is performed through the processor and the memory. The processor may include one or a plurality of processors. In this state, one or a plurality of processor may include a general purpose processor such as, for example, and without limitation, a central processing unit (CPU), a dedicated processor, an application processor (AP), a digital signal processor (DSP), or the like, a graphics dedicated processor such as a graphics processing unit (GPU) or a vision processing unit (VPU), or an AI dedicated processor such as a neural processing unit (NPU), or the like. The one or a plurality of processor may control and process input data according to an AI model or a predefined operation rule stored in the memory When the one or a plurality of processors is an AI dedicated processor, the AI dedicated processor may be designed in a hardware structure specified to the process of a specific AI model.

The predefined operation rule or AI model is characteristically made through training. The being made through training may refer, for example, to, as a basic AI model being trained using a plurality of pieces of training data by a learning algorithm, the predefined operation rule or AI model set to perform a desired feature or purpose is made. The training may be made in a device for performing AI according to the disclosure, and may be made through a separate server and/or system. Examples of the learning algorithm may include supervised learning, unsupervised learning, semi-supervised learning, or reinforcement learning, but the disclosure is not limited to the above-described example.

The AI model may include a plurality of neural network layers. Each of a plurality of neural network layers may have a plurality of weight values, and perform a neural network operation through an operation result of a previous layer and an operation between a plurality of weight values. The weight values of the neural network layers may be optimized by a training result of the AI model. For example, a plurality of weight values may be updated such that a loss value or a cost value obtained from the AI model during a training process is reduced or minimized. An artificial neural network may include, for example, a CNN, a DNN, an RNN, a restricted Boltzmann machine (RBM), a deep belief network (DBN), a bidirectional recurrent deep neural network (BRDNN), a deep Q-network, or the like, but the disclosure is not limited to the above-described example.

According to an embodiment of the disclosure, an image display device and an operation method thereof may be implemented in the form of a non-transitory computer-readable recording medium including computer-executable instructions, such as a program module executed by a computer. A computer-readable storage medium may be a useable medium that is accessible by a computer and may include all of volatile and non-volatile media and separable and inseparable media. Furthermore, the computer-readable medium may include all of computer storage media and communication media. The computer storage media may include all of volatile and non-volatile media and separable and inseparable media, which are embodied by a certain method or technology for storing information such as computer-readable instructions, data structures, program modules, or other data. The communication media may typically include computer-readable instructions, data structures, program modules, or other data of a modulated data signal such as a carrier wave, or other transmission mechanism, and may also include information transmission media.

Furthermore, in the present disclosure, a "part" may refer, for example, to a hardware component such as a processor or a circuit, and/or a software component executed by a hardware component such as a processor.

In the mosaic generation apparatus and method according to an embodiment of the disclosure, as a source image is repeatedly selected for use, a plurality of mosaics may be generated from the same source image.

In the mosaic generation apparatus and method according to an embodiment of the disclosure, as the source image is deformed for use based on the base image, various mosaics may be generated from a certain source image.

In the mosaic generation apparatus and method according to an embodiment of the disclosure, as the source image is deformed for use with the feature of a base image and the feature of a source image, a quality mosaic may be generated.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. A mosaic generation apparatus comprising:
a display outputting an image;
a memory storing one or more instructions; and
a processor configured to execute the one or more instructions stored in the memory to:
randomly select one sub-base area from among a plurality of sub-base areas included in a base image,
extract a first feature value from the one sub-base area randomly selected, the first feature value representing style information of the sub-base area in the base image,
randomly select one source image from among a plurality of source images, wherein the one source image is repeatedly selectable with respect to the plurality of sub-base areas,
extract a second feature value from the one source image randomly selected, the second feature value representing content information of the source image, and
generate a sub-mosaic corresponding to the one sub-base area using the first feature value and the second feature value.

2. The mosaic generation apparatus of claim 1, wherein the processor is further configured to execute the one or more instructions to: generate sub-mosaics respectively corresponding to the plurality of sub-base areas, and generate a mosaic corresponding to the base image using the generated sub-mosaics.

3. The mosaic generation apparatus of claim 2, further comprising: a user interface; and
a communicator comprising communication circuitry,
wherein the user interface is configured to: receive an input of the one sub-base area and the one source image and receive an input of one mosaic selected by the user from among a plurality of mosaics in response to the processor generating the plurality of mosaics corresponding to the base image, and
the communicator is configured to transmit the selected mosaic to an external display.

4. The mosaic generation apparatus of claim 1, wherein the processor is further configured to execute the one or more instructions to: extract the first feature value from a lower level and the second feature value from an upper level, using an artificial intelligence (AI) model including the lower level and the upper level.

5. The mosaic generation apparatus of claim 4, wherein the sub-mosaic is generated such that a sum of a difference between feature values of the sub-mosaic and the sub-base area in the lower level and a difference between feature values of the sub-mosaic and the base area in the upper level is minimum.

6. The mosaic generation apparatus of claim 4, wherein the first feature value comprises one or more pieces of information including at least one of a painting style, a painting type, texture, atmosphere, contrast, gloss, intensity, hue, and saturation of the sub-base image.

7. The mosaic generation apparatus of claim 4, wherein the second feature value comprises content information including one or more of a shape and form of the source image.

8. A computer implemented method for generating a mosaic, the method comprising:
randomly selecting one sub-base area from among a plurality of sub-base areas included in a base image,
extracting a first feature value from the one sub-base area randomly selected the first feature value representing style information of the sub-base area in the base image,
randomly selecting one source image from among a plurality of source images, wherein the one source image is repeatedly selectable with respect to the plurality of sub-base areas,
extracting a second feature value from the one source image randomly selected, the second feature value representing content information of the source image; and
generating a sub-mosaic corresponding to the selected one sub-base area using the first feature value and the second feature value.

9. The mosaic generation method of claim 8, further comprising generating a mosaic corresponding to the base image using sub-mosaics respectively generated with respect to the plurality of sub-base areas.

10. The mosaic generation method of claim 8, wherein the generating of the mosaic comprises extracting the first feature value from a lower level and the second feature value from an upper level, using an artificial intelligence (AI) model including the lower level and the upper level.

11. The mosaic generation method of claim 10, wherein the generating of the sub-mosaic comprises generating the sub-mosaic such that a sum of a difference between feature values of the sub-mosaic and the sub-base area in the lower level and a difference between feature values of the sub-mosaic and the base area in the upper level is minimum.

12. The mosaic generation method of claim 11, wherein the second feature value comprises content information including one or more of a shape and form of the source image.

13. The mosaic generation method of claim 10, wherein the first feature value comprises one or more pieces of information including at least one of a painting style, a painting type, texture, atmosphere, contrast, gloss, intensity, hue, and saturation of the sub-base image.

14. A non-transitory computer readable recording medium having recorded thereon a program for executing, on a computing device, a mosaic generation method comprising:
randomly selecting a sub-base area from among a plurality of sub-base areas included in a base image,
extracting a first feature value from the sub-base area randomly selected the first feature value representing style information of the sub-base area in the base image, randomly selecting a source image from among a plurality of source images, wherein the source image is repeatedly selectable with respect to the plurality of sub-base areas, extracting a second feature value from the source image randomly selected the second feature value representing content information of the source image; and generating a sub-mosaic corresponding to the selected one sub-base area using the first feature value and the second feature value.

* * * * *